(12) United States Patent
Kira et al.

(10) Patent No.: US 8,994,909 B2
(45) Date of Patent: Mar. 31, 2015

(54) LIQUID CRYSTAL DISPLAY PANEL AND LIQUID CRYSTAL DISPLAY DEVICE

(75) Inventors: Takatoshi Kira, Osaka (JP); Tazo Ikeguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 53 days.

(21) Appl. No.: 13/990,696

(22) PCT Filed: Nov. 30, 2011

(86) PCT No.: PCT/JP2011/077679
§ 371 (c)(1),
(2), (4) Date: May 30, 2013

(87) PCT Pub. No.: WO2012/074010
PCT Pub. Date: Jun. 7, 2012

(65) Prior Publication Data
US 2013/0250227 A1    Sep. 26, 2013

(30) Foreign Application Priority Data

Dec. 3, 2010 (JP) ................................. 2010-270606

(51) Int. Cl.
*G02F 1/1335* (2006.01)
*G02F 1/1339* (2006.01)
*G02F 1/1362* (2006.01)

(52) U.S. Cl.
CPC ........ *G02F 1/1339* (2013.01); *G02F 1/136209* (2013.01); *G02F 1/133514* (2013.01); *G02F 2001/133519* (2013.01)

USPC ............................................. 349/153

(58) Field of Classification Search
USPC .......................................... 349/153
See application file for complete search history.

(56) References Cited

U.S. PATENT DOCUMENTS

| | | | |
|---|---|---|---|
| 3,947,091 A * | 3/1976 | Trcka ............................... | 349/57 |
| 5,155,612 A * | 10/1992 | Adachi et al. ................... | 349/111 |
| 6,204,906 B1 * | 3/2001 | Tannas, Jr. ...................... | 349/153 |
| 7,697,104 B2 * | 4/2010 | Fu ................................... | 349/153 |
| 2009/0231524 A1 * | 9/2009 | Tanaka ........................... | 349/110 |

FOREIGN PATENT DOCUMENTS

| | | |
|---|---|---|
| JP | 2008-158169 A | 7/2008 |
| JP | 2010-85646 A | 4/2010 |

* cited by examiner

*Primary Examiner* — James Dudek
(74) *Attorney, Agent, or Firm* — Chen Yoshimura LLP

(57) ABSTRACT

The width W1 of a groove (5a) is formed narrower than the width W2 of a groove (6a). The width W2 of the groove (6a) is formed at a prescribed width such that a sealing material (8) that overflows the groove (5a) can be formed along the groove (6a). The sealing material (8) spreads across the entirety of the groove (5a) and the groove (6a) when a color filter substrate (2) and an active matrix substrate (3) are bonded together. The groove (5a) is formed so as to be positioned within the groove (6a) in a plan view.

10 Claims, 12 Drawing Sheets

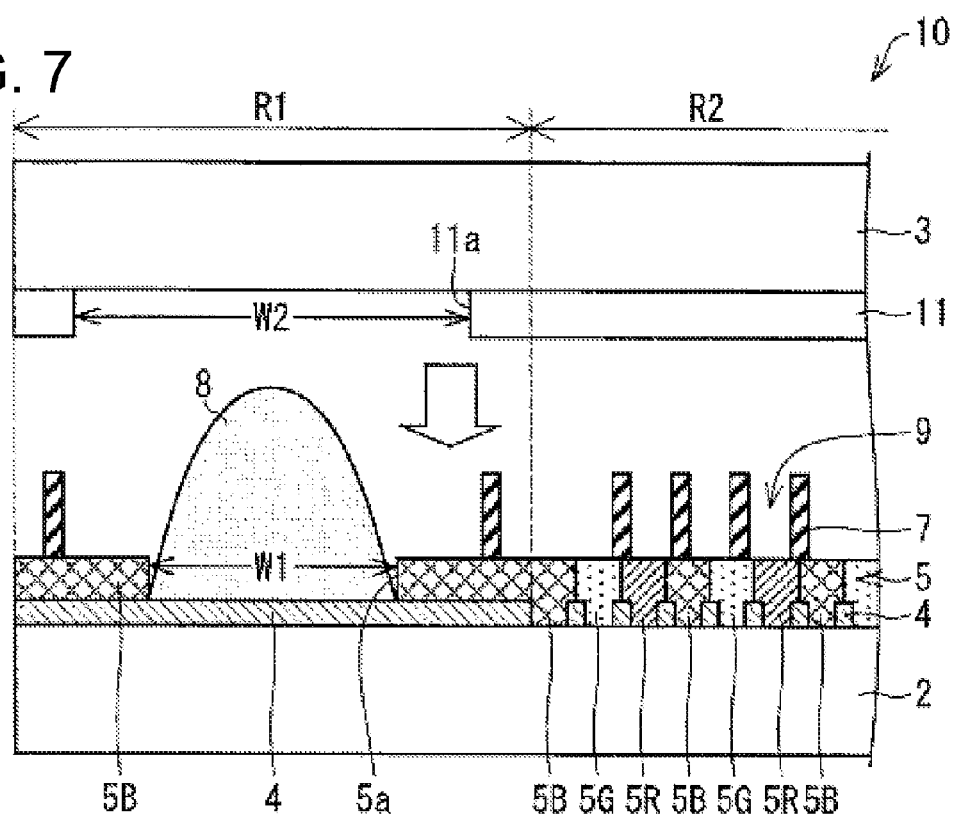
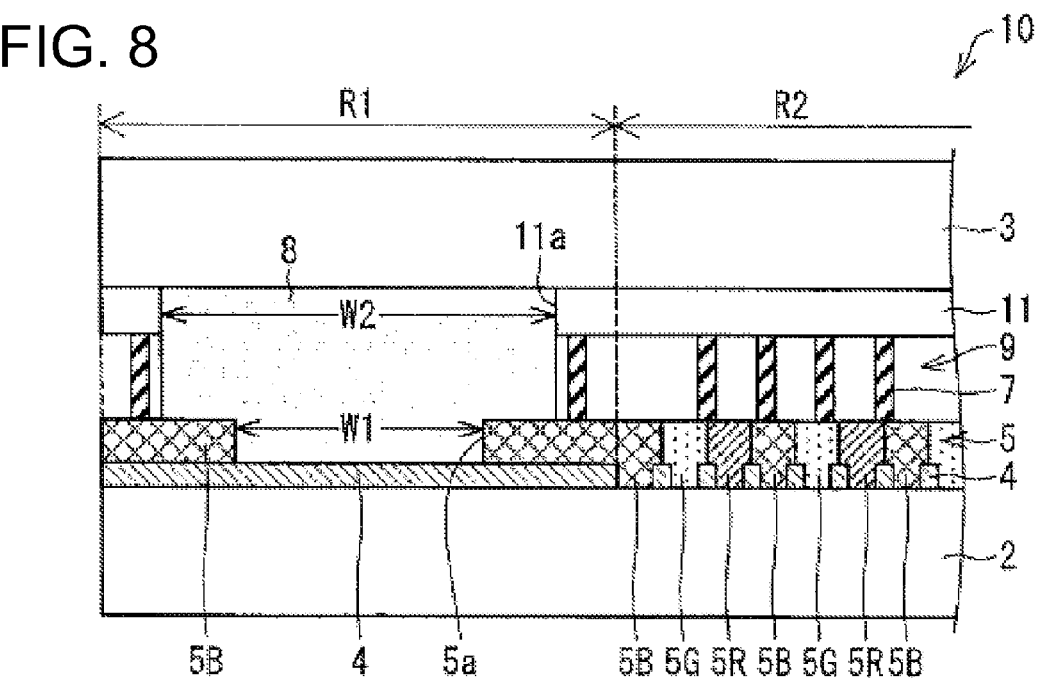

FIG. 14
(a)
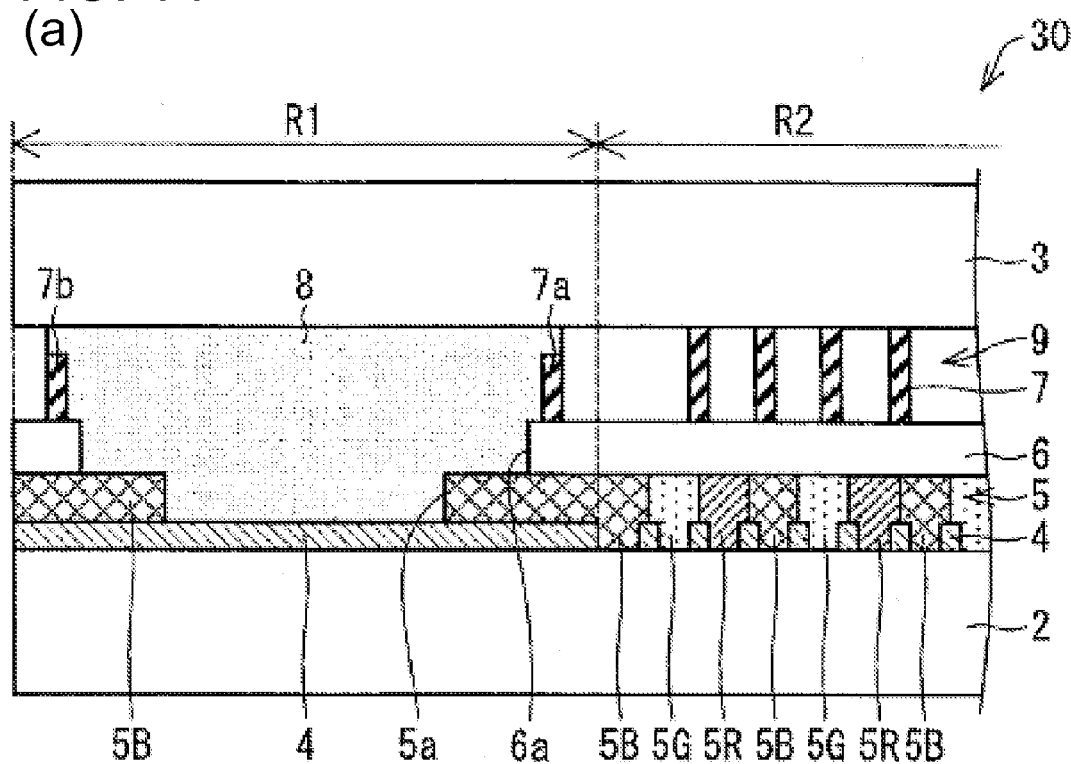
(b)
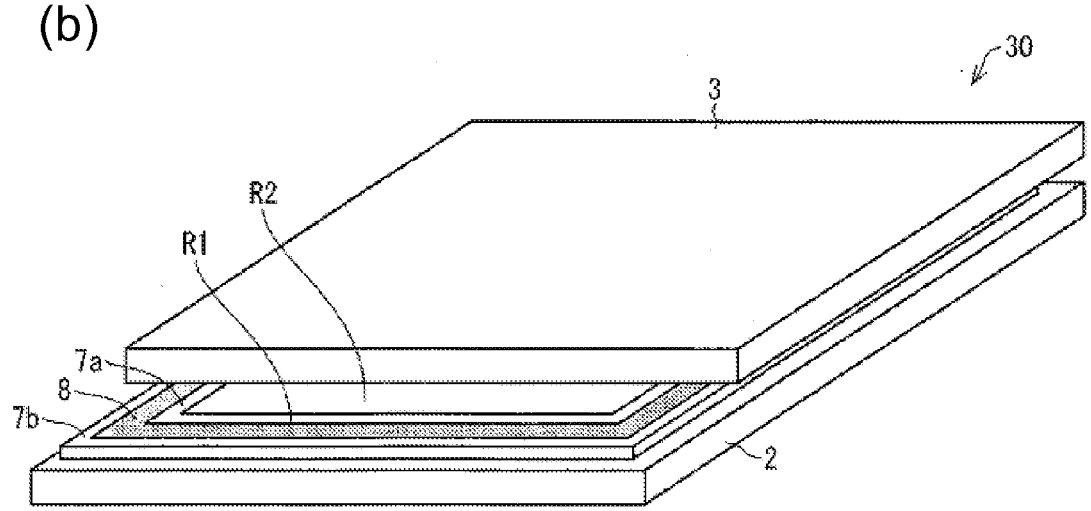

FIG. 17
(a)
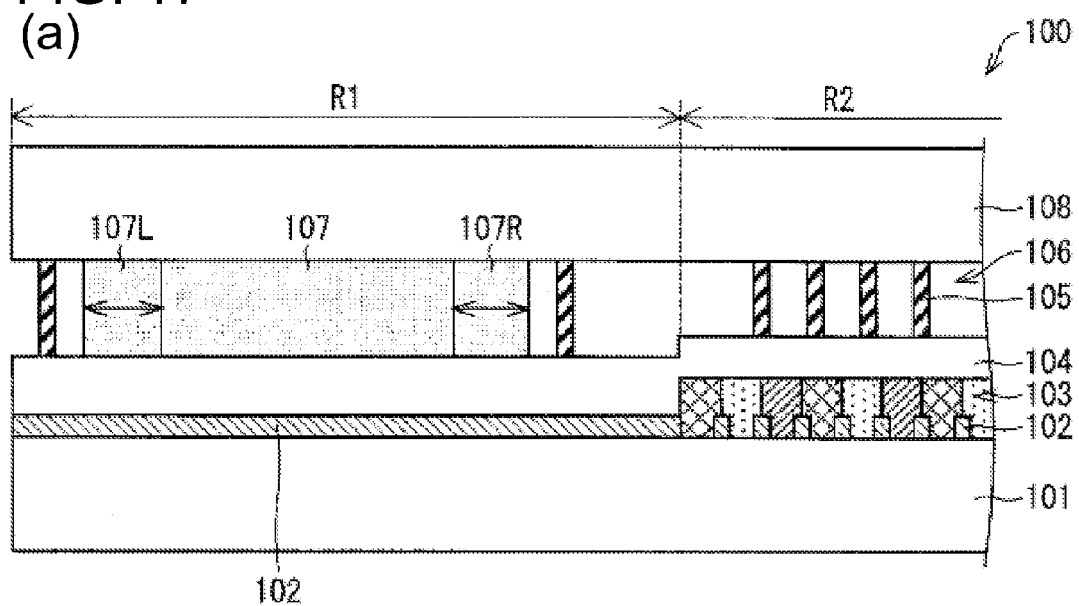
(b)
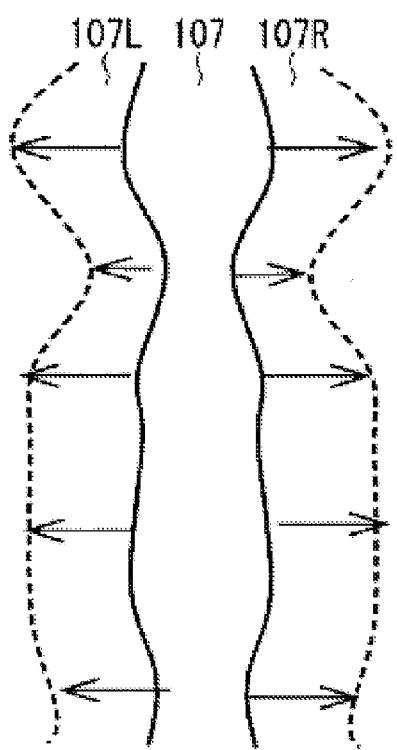

FIG. 18
(a)
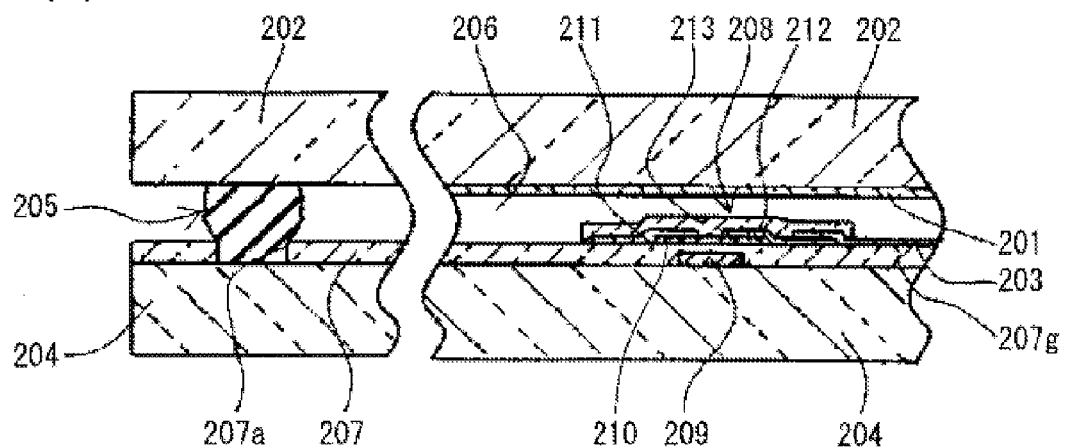
(b)
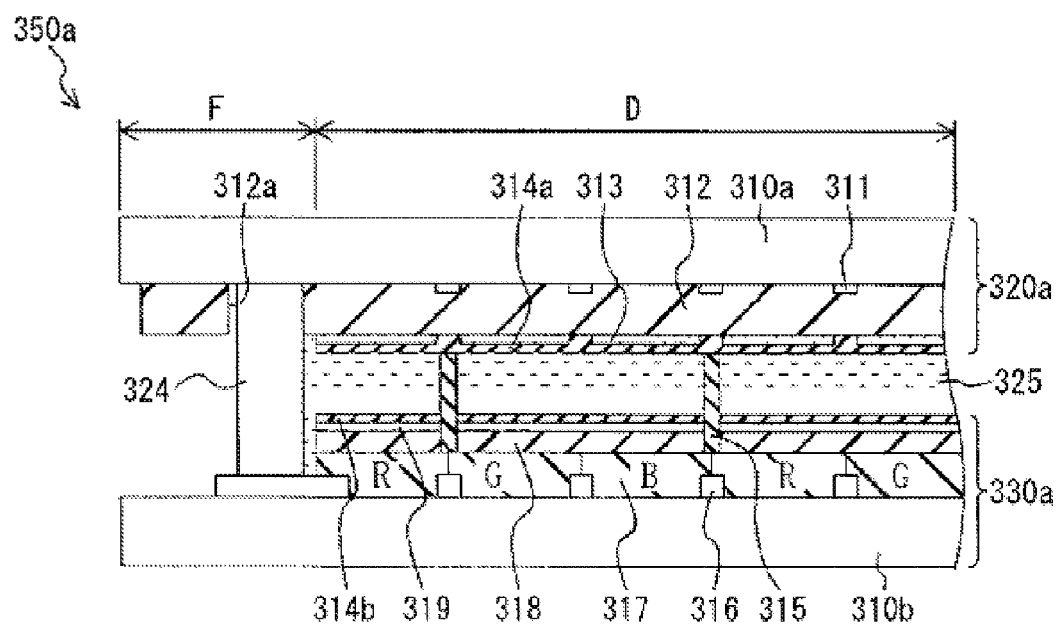

LIQUID CRYSTAL DISPLAY PANEL AND LIQUID CRYSTAL DISPLAY DEVICE

TECHNICAL FIELD

The present invention relates to a liquid crystal display panel and a liquid crystal display device that includes a liquid crystal display panel, and particularly to narrowing the frame of the liquid crystal display panel.

BACKGROUND ART

In recent years, in mobile devices such as portable televisions, mobile telephones, smartphones, MP3 players, and automotive navigation systems, it is desirable for moving images, still images, and the like to be displayed in a larger display screen without increasing the size of the mobile device itself.

As a display device installed in such a mobile device, a liquid crystal display device is in general use due to being energy-saving, thin, light-weight, and the like, in addition to the high productivity of liquid crystal display devices.

However, in conventional liquid crystal display panels included in liquid crystal display devices, there were limits to how large the display region of the liquid crystal display panel could be made, or in other words, how narrow the frame region, which is a non-display region, could be made, due to the following problems.

FIG. 17(a) shows a frame region in a conventional liquid crystal display panel, and FIG. 17(b) shows a width of a sealing material formed in the frame region of the liquid crystal display panel shown in FIG. 17(a) at the time of drawing compared to the width of the sealing material after both substrates have been bonded together.

As shown in FIG. 17(a), a liquid crystal display panel 100 includes a color filter substrate 101 and an active matrix substrate 108 disposed facing each other.

In a non-display region (frame region) R1 of the liquid crystal display panel 100, a black matrix layer 102 and an overcoat layer 104 are layered in this order on the color filter substrate 101.

On the other hand, in a display region R2 of the liquid crystal display panel 100, the black matrix layer 102 is formed in a grid pattern on the color filter substrate 101, color filter layers 103 of respective colors (red, blue, green) are formed on the black matrix layer 102 formed in a grid pattern, and the overcoat layer 104 is formed covering the color filter layers 103 of the respective colors.

A common electrode layer (not shown in drawings) made of a transparent conductive material such as ITO (indium tin oxide) is formed on the overcoat layer 104 in the non-display region R1 and the display region R2 of the liquid crystal display panel 100, and photospacers 105 for maintaining a uniform distance (cell gap) between the color filter substrate 101 and the active matrix substrate 108 are formed on the common electrode layer.

An alignment film (not shown in drawings) is formed on the topmost layer of the color filter substrate 101.

On the other hand, in the display region R2 portion of the active matrix substrate 108 of the liquid crystal display panel 100, a plurality of TFT elements, a plurality of signal lines, pixel electrodes made of a transparent conductive material such as ITO formed for respective pixels, and an alignment film are formed, although these are not shown in the drawings.

In general, a drawing device such as a dispenser device is used to form a sealing material 107 in a frame shape in the periphery of the color filter substrate 101, and after liquid crystal 106 is dripped into the inner side of the sealing material 107, the color filter substrate 101 and the active matrix substrate 108 are bonded together.

As shown in FIG. 17(b), when the sealing material 107 is formed using a drawing device such as a dispenser device, undulations occur in the drawn sealing material 107 due to variations resulting from various causes such as vibration during drawing, output pressure, and the height of the output hole.

The cross-sectional area of the sealing material 107 drawn by such a drawing device generally has a variation of approximately 10% to 30%. When the color filter substrate 101 and the active matrix substrate 108 are bonded together using the sealing material 107 formed in this manner, the variation in cross-sectional area directly results in variation in the width direction of the sealing material 107 (left and right direction in the drawing), thus resulting in even larger undulations in the sealing material 107.

In other words, when forming the sealing material 107 using a drawing device such as a dispenser device, the output amount of the sealing material 107 varies due to the above-mentioned reasons, and variation occurs in the width direction (left and right direction) and the height direction of the sealing material 107. As a result, as shown in FIG. 17(b), when bonding together the color filter substrate 101 and the active matrix substrate 108, variation also occurs in the width (107L, 107R) of the sealing material 107 spreading in the left and right direction in the drawing.

In such a conventional configuration, a relatively large variation occurred in the width of the sealing material 107 formed in the non-display region R1 (frame region), and therefore, it was difficult to realize a narrower frame in the liquid crystal display panel because the width of the non-display region R1 (frame region) depended on this variation.

More specifically, FIG. 17(a) shows a frame region in one out of a plurality of liquid crystal display panels 100 attained by separating a panel that includes a plurality of liquid crystal display panels 100 and that has a large display region R2 relative to the outer shape of the panel. If the sealing material 107 spreads to the separation line that separates the panel having a large display region R2 relative to the outer shape of the panel into the plurality of liquid crystal display panels 100, this causes a worsening of the separation property. Thus, it is necessary to provide a margin region of a certain width, but if there is relatively large variation in the width of the sealing material 107 as in the conventional configurations, then the margin region of a certain width has to be made wide, thus presenting a difficulty in narrowing the frame of the liquid crystal display panel.

Thus, techniques to mitigate variation in the width of the sealing material 107 formed in the non-display region R1 (frame region) such as that mentioned above have been studied since before.

For example, Patent Document 1 discloses a configuration in which a groove that defines the width of the sealing material 107 is formed on an insulating film provided in a liquid crystal display panel.

FIG. 18(a) shows a schematic configuration of the liquid crystal display panel disclosed in Patent Document 1.

As shown, the liquid crystal display panel includes an opposite substrate 202 provided with an opposite electrode 201, and a pixel substrate 204 provided with pixel electrodes 203. The inner surfaces of the respective substrates where the opposite electrode 201 and the pixel electrodes 203 are formed face each other, and the opposite substrate 202 and the pixel substrate 204 are bonded together through a sealing material 205.

The sealing material 205 is formed in a frame on the four sides of the liquid crystal display panel, which constitute the non-display region of the liquid crystal display panel, surrounding the display region where a plurality of pixels provided in the liquid crystal display panel are arranged.

Liquid crystal 206 is sealed between the opposite substrate 202 and the pixel substrate 204.

A gate electrode 209, a gate insulating film 207g (insulating film 207 in the non-display region), a semiconductor film 210, a source electrode 211, a drain electrode 212, and a protective insulating film 213 constitute a thin film transistor 208 formed on the pixel substrate 204, and the drain electrode 212 of the thin film transistor 208 and the pixel electrode 203 are electrically connected to each other.

In the insulating film 207 formed in the non-display region of the liquid crystal display panel, a groove 207a having a width corresponding to the width of the sealing material 205 provided on the substrate by silkscreen printing, a dispenser device, or the like is formed, and as a result of the groove 207a, when the opposite substrate 202 and the pixel substrate 204 are bonded together, the width to which the sealing material 205 spreads can be defined, thus allowing the frame of the liquid crystal display panel to be narrowed to a certain extent.

Patent Document 2 discloses a configuration in which a first overcoat film is provided on an active matrix substrate of a liquid crystal display panel in order to flatten the surface, and a groove for disposing a sealing material therein is formed in the first overcoat film in a frame shape.

FIG. 18(b) shows a schematic configuration of the liquid crystal display panel disclosed in Patent Document 2.

As shown, an active matrix substrate 320a and an opposite substrate 330a, which face each other, are included in the liquid crystal display panel 350a, and a liquid crystal layer 325 and a sealing material 324 provided surrounding the liquid crystal layer 325 are provided between both substrates 320a and 330a.

The active matrix substrate 320a includes an insulating substrate 310a, a thin film transistor array that includes a plurality of gate wiring lines 311 provided on the insulating substrate 310a, a first overcoat film 312 provided as a planarizing film that covers the thin film transistor array, a plurality of pixel electrodes 313 provided in a matrix on the first overcoat film 312, and an alignment film 314a provided covering the respective pixel electrodes 313.

On the other hand, the opposite substrate 330a includes an insulating substrate 310b, a black matrix 316 provided in a grid pattern on the insulating substrate 310b, a plurality of colored layers 317 respectively colored red (R), green (G), or blue (b) and provided between the respective grids of the black matrix 316, photospacers 315 provided in a columnar shape over the respective colored layers 317 overlapping the black matrix 316, a second overcoat film 318 provided as a planarizing film covering the respective colored layers 317, a common electrode 319 provided on the second overcoat film 318, and an alignment film 314b provided covering the common electrode 319.

As shown, in a non-display region F (frame region), which is a region peripheral to a display region D in the liquid crystal display panel 350a, a groove 312a for disposing a sealing material 324 therein is formed in the first overcoat film 312 in a frame shape along the region where the sealing material 324 is to be formed.

According to the configuration above, it is possible to reliably form the sealing material 324 in a prescribed region in the liquid crystal display panel 350a, thus allowing the frame of the liquid crystal display panel 350a to be narrowed.

RELATED ART DOCUMENTS

Patent Documents

Patent Document 1: Japanese Patent Application Laid-Open Publication No. 2010-85646 (published Apr. 15, 2010)
Patent Document 2: Japanese Patent Application Laid-Open Publication No. 2008-158169 (published Jul. 10, 2008)

SUMMARY OF THE INVENTION

Problems to be Solved by the Invention

However, as shown in FIG. 18(a), in Patent Document 1, the width of the groove 207a is formed so as to correspond to the average width of the sealing material 205 when the opposite substrate 202 and the pixel substrate 204 are bonded together.

In such a configuration, as stated above, if the sealing material 205 is formed by a drawing device such as a dispenser device, for example, there are variations in the amount of the sealing material 205 formed, and thus, there are also variations in the amount of the sealing material 205 overflowing the groove 207a.

Thus, the width of the sealing material 205 overflowing the groove 207a also varies, which means that it is difficult to keep the variation in the width within a prescribed range. Thus, with the configuration of Patent Document 1, it is difficult to attain a narrower frame in the liquid crystal display panel to a satisfactory degree.

In Patent Document 2 also, an attempt is made to narrow the frame of the liquid crystal display panel by providing the groove 312a to define the width of the sealing material 324.

However, the width of the groove 312a formed in the first overcoat film 312 is narrower than the width to which the sealing material 324 spreads due to the sealing material 324 being compressed when the active matrix substrate 320a and the opposite substrate 330a are bonded together.

Thus, in a manner similar to Patent Document 1, the width of the sealing material 324 formed overflowing the groove 312a also varies, and it is difficult to keep the variation in the width within a prescribed range. Thus, with the configuration of Patent Document 2, it is difficult to narrow the frame of the liquid crystal display panel to a satisfactory degree.

The present invention was made in view of the above-mentioned problems, and an object thereof is to provide a liquid crystal display panel that can attain a narrower frame, and a liquid crystal display device with a large display region.

Means for Solving the Problems

In order to solve the above-mentioned problems, a liquid crystal display panel of the present invention includes a first substrate and a second substrate disposed facing each other, the first substrate and the second substrate having therebetween: a liquid crystal layer; a sealing material provided surrounding the liquid crystal layer and bonding together the first substrate and the second substrate; and a plurality of films provided on at least one of the first substrate and the second substrate, wherein the plurality of films includes at least a first film and a second film, the first film having a first groove, the second film having a second groove, respectively provided in a frame shape in a non-display region that is a region peripheral to a display region of the liquid crystal display panel, the first groove and the second groove being provided to dispose the sealing material along the non-display region, wherein the first groove has a width narrower than a width of the second groove, wherein the width of the second groove is set at a prescribed width such that when the first substrate and the second substrate are bonded together, a portion of the sealing material that overflows the first groove can be provided along the second groove, wherein the sealing material spreads in the entirety of the first groove and the second groove when the first substrate and the second substrate are bonded together, and wherein the first groove is positioned within the second groove in a plan view.

In a conventional configuration, the groove for defining the width to which the sealing material spreads when compressed by both substrates was formed so as to be equal to the average width of the sealing material when the substrates are bonded together, or less than that width.

Furthermore, when forming the sealing material using a drawing device such as a dispenser device, there was variation in the amount of sealing material outputted, and thus, there was variation in the amount of sealing material overflowing the groove.

As stated above, in a conventional configuration, there was a relatively large variation in the width of the sealing material formed in the non-display region (frame region). When taking into consideration that the separation property would worsen if the sealing material spreads to the separation line separating a panel, in which the display region is large relative to the outer shape of the panel, into a plurality of liquid crystal display panels, there is a need to guarantee a margin region of a certain width. If there is a relatively large variation in the width of the sealing material as in the conventional configurations, it is necessary to have the margin region of a certain width be wide, and thus, it was difficult to attain a narrower frame for the liquid crystal display panel.

On the other hand, with the configuration of the present invention, the non-display region (frame region) has the first groove and the second groove for forming the sealing material therein, the width of the second groove is larger than the width of the first groove, and when the first substrate and the second substrate are bonded together, the sealing material is formed to a prescribed width because the sealing material overflowing the first groove can be formed along the second groove.

Also, with the configuration above, when the first substrate and the second substrate are bonded together, the sealing material has spread along the entirety of the first groove and the second groove, and thus, the width of the first groove and the width of the second groove are formed at approximately the width to which the sealing material spreads.

Thus, when bonding together the first substrate and the second substrate included in the liquid crystal display panel, even if variation occurs in the amount of sealing material overflowing the first groove, it is possible to even out such variation using the second groove.

Thus, according to the configuration above, variation in the width of the sealing material formed in the non-display region (frame region) can be mitigated, and therefore, it is possible to form the margin region of a certain width narrower than in conventional configurations, allowing a narrower frame to be attained for the liquid crystal display panel.

The liquid crystal display device of the present invention includes the above-mentioned liquid crystal display panel in order to solve the above-mentioned problems.

According to the configuration above, the above-mentioned liquid crystal display panel is included, and thus, a liquid crystal display device with a large display region can be attained.

Effects of the Invention

As stated above, the liquid crystal display panel of the present invention has a configuration, wherein, among the plurality of films, a first film has a first groove, and a second film has a second groove, respectively provided in a frame shape, in order to dispose the sealing material along the non-display region, which is a region peripheral to a display region of the liquid crystal display panel, wherein the first groove is narrower in width than the width of the second groove, wherein the width of the second groove is set at a prescribed width such that when the first substrate and the second substrate are bonded together, a portion of the sealing material that overflows the first groove can be provided along the second groove, wherein the sealing material spreads in the entirety of the first groove and the second groove when the first substrate and the second substrate are bonded together, and wherein the first groove is positioned within the second groove in a plan view.

The liquid crystal display device of the present invention includes the liquid crystal display panel as described above.

Thus, an object of the present invention is to provide a liquid crystal display panel that can attain a narrower frame, and a liquid crystal display device with a large display region.

BRIEF DESCRIPTION OF THE DRAWINGS

FIG. 7 shows a state before a color filter substrate and an active matrix substrate are bonded together in a liquid crystal display panel of another embodiment of the present invention.

FIG. 8 shows a state after a color filter substrate and an active matrix substrate are bonded together in a liquid crystal display panel of the other embodiment of the present invention.

FIG. 14 shows a state after the color filter substrate and the active matrix substrate are bonded together and the state of the sealing material formed between the wall-shaped structures in the liquid crystal display panel of yet another embodiment of the present invention in which wall-shaped structures are formed in the frame region.

FIG. 17 shows a frame region in a conventional liquid crystal display panel, and shows the width of the sealing material formed in the frame region during drawing and the width of the sealing material after both substrates are bonded together.

FIG. 18 shows a schematic configuration of liquid crystal display panels disclosed in Patent Document 1 and Patent Document 2.

DETAILED DESCRIPTION OF EMBODIMENTS

Below, embodiments of the present invention will be explained in detail with reference to figures. However, dimensions, materials, shapes, positional relationships, and the like of constituting members described in these embodiments are merely individual embodiment examples, and the scope of the present invention shall not be narrowly interpreted by being limited thereto.

Embodiment 1

A schematic configuration of a liquid crystal display panel 1 of one embodiment of the present invention will be described below with reference to FIGS. 1 to 3.

Figure 3:
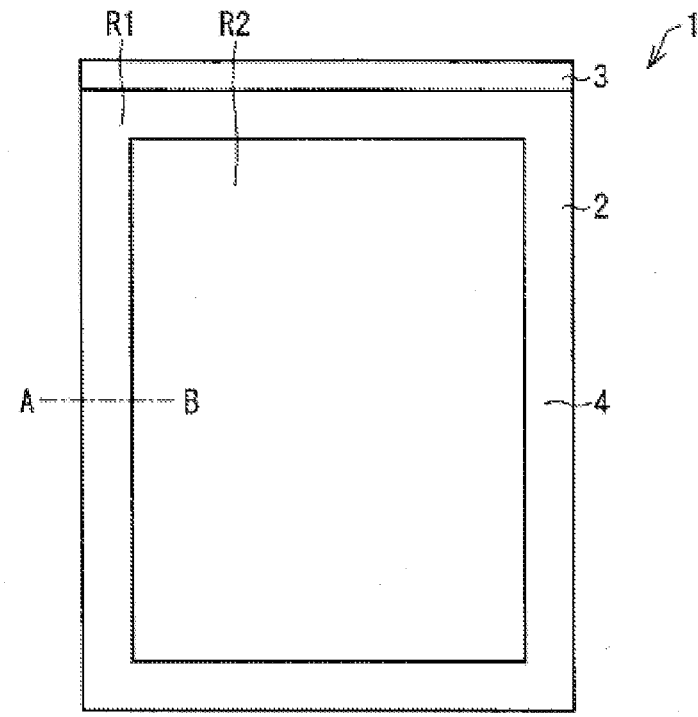
FIG. 3 is a plan view of the liquid crystal display panel of one embodiment of the present invention.

FIG. 3 is a plan view of the liquid crystal display device 1.

As shown, the liquid crystal display panel 1 includes a color filter substrate 2 and an active matrix substrate 3 disposed facing each other.

In the liquid crystal display panel 1, a frame region R1, which is a non-display region, is formed on edges of the liquid crystal display panel 1, and a display region R2 is surrounded by the frame region R1.

Although not shown in the drawing, a sealing material, which will be described in detail later, is formed in a frame shape along the frame region R1 in order to bond together the color filter substrate 2 and the active matrix substrate 3, and liquid crystal is sealed by the surrounding sealing material and between the substrates 2 and 3.

The frame region R1 has a black matrix layer 4 formed in a frame shape as a light-shielding layer that shields light.

Figure 1:
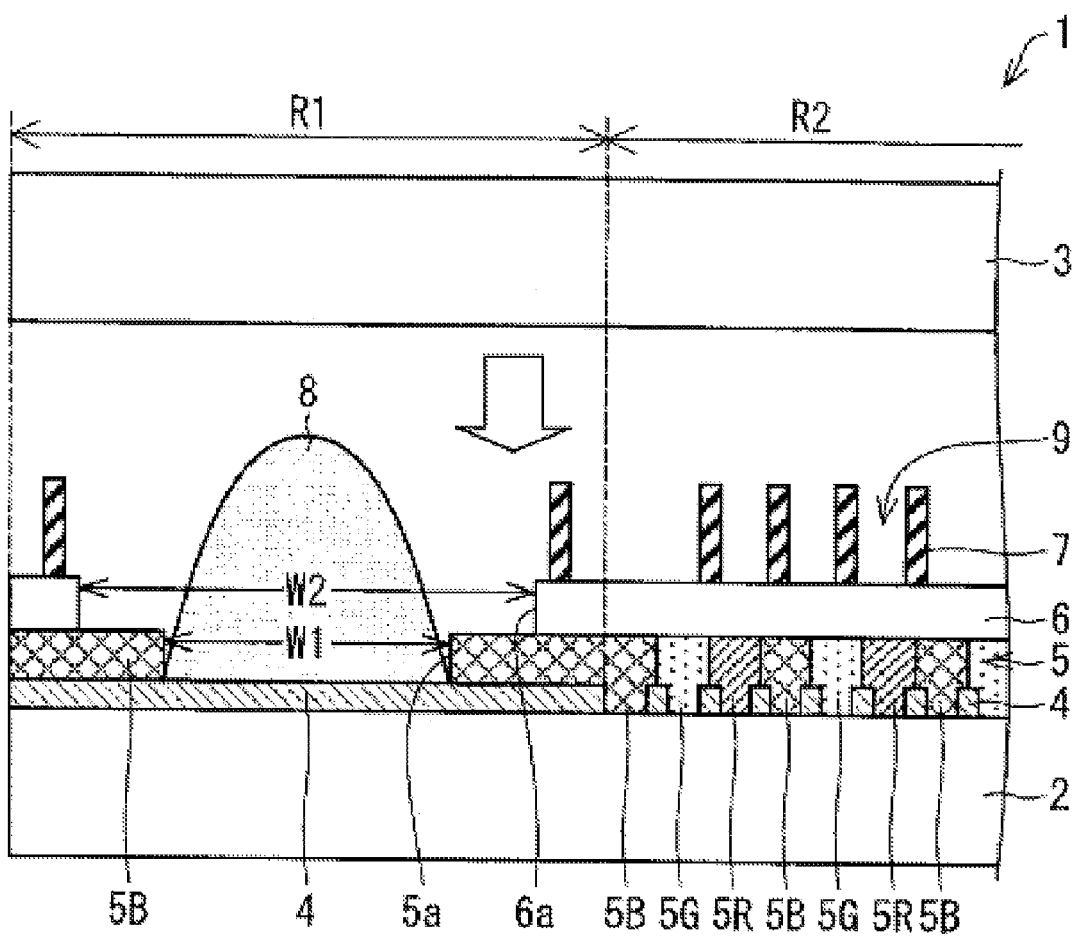
FIG. 1 shows a cross-section of a liquid crystal display panel of one embodiment of the present invention along the line AB in FIG. 3, and shows a state before a color filter substrate and an active matrix substrate are bonded together.
Figure 2:
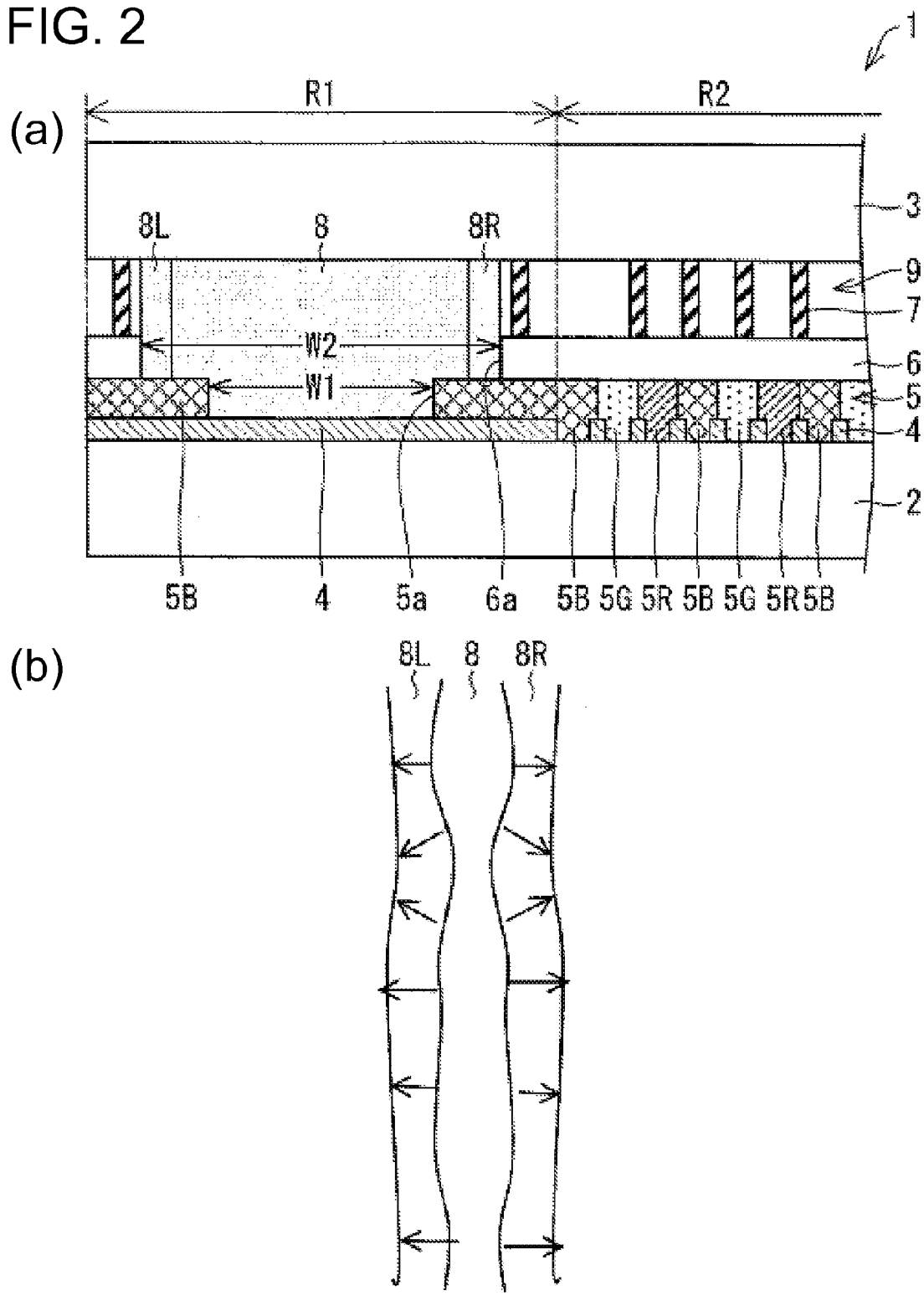
FIG. 2 shows a cross-section of a liquid crystal display panel of one embodiment of the present invention along the line AB in FIG. 3, and shows a state after a color filter substrate and an active matrix substrate are bonded together, and the shape of the sealing material at that time.

FIGS. 1 and 2 are cross-sectional views along the line AB of the liquid crystal display panel 1 shown in FIG. 3. FIG. 1 shows a state before the color filter substrate 2 and the active matrix substrate 3 are bonded together, and FIG. 2 shows a state after the color filter substrate 2 and the active matrix substrate 3 are bonded together.

As shown in FIGS. 1 and 2, a black matrix layer 4, color filter layers 5R, 5B, and 5G of respective colors (red, blue, and green), and an overcoat layer 6, which is a planarizing film, are layered on the color filter substrate 2 in this order.

In the frame region R1 of the color filter substrate 2, the black matrix layer 4, the blue color filter layer 5B, and the overcoat layer 6 are layered in this order, while in the display region R2 of the color filter substrate 2, the black matrix layer 4 is formed in a grid pattern, and the color filter layers 5R, 5B, and 5G of the respective colors (red, blue, and green) are formed adjacent to each other on the black matrix layer 4 formed in a grid pattern. The overcoat layer 6 is formed so as to cover the color filter layers 5R, 5B, and 5G of the respective colors (red, blue, and green), which are formed adjacent to each other.

In the present embodiment, the thicknesses of the color filter layers 5R, 5B, and 5G of the respective colors (red, blue, and green), and the overcoat layer 6 are respectively approximately 2 µm to 3 µm, but as long as the thickness allows these to respectively function as colored layers of the respective colors and a planarizing film, the thicknesses thereof are not limited to this range.

Also, in the present embodiment, the three colors of red, blue, and green are used as color filter layers, but the colors are not limited thereto, and may include four colors in which yellow is used in addition to the aforementioned three colors, for example.

As shown in FIG. 1, in the frame region R1 of the liquid crystal display panel 1, the blue color filter layer 5B formed covering the black matrix layer 4 provided on the color filter substrate 2 has a groove 5a (first groove) having a prescribed width W1 in the left and right direction of the drawing for disposing a sealing material 8 therein.

The width W1 of the groove 5a is larger than a width of the lowest part of the sealing material 8 in a cross-section of the sealing material 8 in FIG. 1, or in other words, the width of the sealing material where it is in contact with the black matrix layer 4 (hereinafter referred to as a drawing width), the black matrix layer 4 being a film therebelow, and the width W1 is smaller than a width W2 of a groove 6a described below.

As shown in FIG. 1, in the frame region R1 of the liquid crystal display panel 1, the groove 6a (second groove) having a prescribed width W2 is formed in the overcoat layer 6 formed on the blue color filter layer 5B in order to stop the spread of the sealing material 8 that has overflowed the groove 5a.

The width W2 of the groove 6a is larger than the width W1 of the groove 5a, and the widths W1 and W2 are the following prescribed widths such that the portion of the sealing material 8 that has overflowed the groove 5a is formed along the groove 6a when the color filter substrate 2 and the active matrix substrate 3 are bonded together.

In the present embodiment, the width W1 of the groove 5a is 300 µm, and the width W2 of the groove 6a is 500 µm.

Also, in the present embodiment, in order to effectively stop the leakage of light, a black matrix layer 4 is provided on the entirety of the frame region R1 of the liquid crystal display panel 1, but the configuration is not limited thereto. Small cracks and the like that are visible to the viewer sometimes form in the black matrix layer 4 during separation if a black matrix layer 4 is provided reaching the separation line (left edge of the frame region R1 of FIG. 1) that separates a panel having a large display region R2 relative to the outer shape of the panel into a plurality of liquid crystal display panels. Therefore, a configuration in which the black matrix layer 4 is not provided reaching the separation line and in which the portion where the black matrix layer 4 is not provided is covered by a case can be used.

As shown in the drawing, in the frame region R1 of the liquid crystal display panel 1, the center of the groove 5a and the center of the groove 6a match, and both edges of the sealing material 8 storing portion formed by the groove 5a and the groove 6a are formed in a step shape.

In the present embodiment, a case in which the groove 5a and the groove 6a are formed respectively in the blue color filter layer 5B and the overcoat layer 6, which are relatively thick, is described as an example, but the configuration is not limited thereto. As long as any one of the edges of the sealing material 8 storing portion can be formed in a step shape, the sealing material 8 storing portion can be formed of one film provided between the color filter substrate 2 and the active matrix substrate 3, or of a plurality of films numbering three or greater.

In the present embodiment, a dispenser device, which is a drawing device, was used in order to form the sealing material 8 in the storing portion.

However, if the sealing material is to be formed using a dispenser device, the amount of the sealing material formed on the color filter substrate varies depending on variation in the output pressure of the sealing material from the dispenser device, vibration in the dispenser device, the space between the nozzle of the dispenser device and the color filter substrate, and the like.

Because of these factors, if there are regions in which the amount of sealing material formed on the color filter substrate is large, for example, then the sealing material in such regions protrudes to the separation line that separates the panel having a relatively large display region R2 relative to the outer shape of the panel into a plurality of liquid crystal display panels, thus sometimes resulting in defects.

If, in order to mitigate such defects, the sealing material storing portion is made wide, then there is a problem that the frame region where the sealing material is formed becomes large.

In the liquid crystal display panel 1 of FIG. 1, the groove 5a and the groove 6a are formed in the frame region R1 of the liquid crystal display panel 1, which is a region where the sealing material 8 is disposed, and using the groove 5a and the groove 6a, the above-mentioned regions where the amount of the sealing material is large are evened out, thus allowing the frame region R1 of the liquid crystal display panel 1 to be narrowed.

In the present embodiment, the sealing material 8 is formed using a dispenser device, which is a drawing device, but the device used is not limited thereto, and the sealing material 8 can be formed by silkscreen printing or the like, for example.

Even if the sealing material 8 is formed on the color filter substrate by silkscreen printing, the amount of sealing material 8 provided on the color filter substrate can vary, and thus, it is possible to suitably use the configuration of the liquid crystal display panel 1 in this case also.

In addition, in the present embodiment, in order to form the color filter layers 5R, 5B, and 5G of the respective colors (red, blue, and green), negative colored photoresists of the respective colors (red, blue, and green) are used, and in order to form the overcoat layer 6, a negative acrylic photosensitive transparent photoresist is used.

Thus, the groove 5a and the groove 6a can be formed only by exposure and developing steps.

The overcoat layer 6 can be made of a heat-curable material that is not photosensitive, and in such a case, the groove 6a can be formed by dry etching.

A common electrode layer (not shown in drawings) made of a transparent conductive film such as ITO is formed on the overcoat layer 6 of the color filter substrate 2 in the display region R2 of the liquid crystal display panel 1. On prescribed portions of the common electrode layer or the overcoat layer 6, photospacers 7 made of a negative acrylic photosensitive transparent photoresist are formed in a columnar shape in order to maintain the gap between the color filter substrate 2 and the active matrix substrate 3, or in other words, the cell gap at a prescribed value.

Also, the positions where the photospacers 7 are formed are not limited as long as the gap between the color filter substrate 2 and the active matrix substrate 3 can be maintained at a prescribed value, but when taking into consideration a decrease in transmittance in the display region R2 due to the photospacers 7 being formed, it is preferable that the photospacers 7 be formed on the black matrix layer 4 and on the blue color filter layer 5B.

In the present embodiment, photospacers 7 are used in order to maintain the gap between the color filter substrate 2 and the active matrix substrate 3 at a prescribed value, but the configuration is not limited thereto, and spherical spacers or the like can be used, for example.

In the present embodiment, photospacers 7 are also provided on the overcoat layer 6 of the color filter substrate 2 in the frame region R1 of the liquid crystal display panel 1.

An alignment film (not shown in drawing) is formed on the entire surface of the color filter substrate 2 where the overcoat layer 6 is formed.

This means that the alignment film is also formed in the groove 5a, but because the alignment film is thin, effects by the alignment film are negligible.

On the other hand, the surface of the active matrix substrate 3 facing the color filter substrate 2 includes TFT elements, wiring lines electrically connected to the TFT elements, a plurality of insulating layers, pixel electrodes provided for the respective pixels, and an alignment film, although these are not shown in the drawings.

In the present embodiment, liquid crystal 9 was injected into the liquid crystal display panel 1 by the one drop filling method, and after the sealing material 8 is formed on the color filter substrate 2 in a frame shape, and the liquid crystal 9 is dropped in the inner side thereof, the surface of the color filter substrate 2 where the sealing material 8 and the like are formed, and the surface of the active matrix substrate 3 where the alignment film and the like are formed are bonded together, thus forming the liquid crystal display panel 1.

Injection of the liquid crystal 9 into the liquid crystal display panel 1 can be conducted by another method such as the vacuum injection method.

Below, with reference to FIGS. 2(a) and 2(b), reasons that variation in the region where the sealing material 8 is formed can be mitigated when the color filter substrate 2 and the active matrix substrate 3 are bonded together by providing the frame-shaped groove 5a and groove 6a along the frame region R1 of the liquid crystal display panel 1 despite variation in the amount of the sealing material 8 formed on the color filter substrate 2 will be described.

FIG. 2(a) shows a state after the color filter substrate 2 and the active matrix substrate 3 in the liquid crystal display panel 1 shown in FIG. 1 are bonded together.

In the present embodiment, the sealing material 8 is formed by a dispenser device, which is a drawing device, and thus, variation occurs in the amount of the sealing material 8 drawn on the color filter substrate 2; the drawing width is approximately 200 μm to 300 μm, and the height is approximately 15 μm to 25 μm (refer to FIG. 1).

As shown in FIG. 2(a), the sealing material 8 spreads when the color filter substrate 2 and the active matrix substrate 3 are bonded together, but as a result of both edges of the groove 5a with a width of W1 provided in the blue color filter layer 5B, it is possible to a certain extent to even out the varied width of the sealing material 8 in the left and right direction in the drawing, or in other words the drawing width thereof.

The sealing material 8 also has variation in height, which also causes variation in the amount of the sealing material 8 that overflows the groove 5a, but this variation is evened out by both edges of the groove 6a having a width of W2.

Therefore, as shown in FIG. 2(b), even if variation occurs in the drawing width of the sealing material 8, the width 8R and 8L of the sealing material 8 that spreads when the color filter substrate 2 and the active matrix substrate 3 are bonded together evens out as a result of the groove 5a and the groove 6a, and thus, variation in the final width of the sealing material 8 can be mitigated.

As stated above, the frame region R1 of the liquid crystal display panel 1 is provided with the frame-shaped groove 5a and groove 6a along the frame region R1, the center of the groove 5a matches with the center of the groove 6a, and both edges of the sealing material 8 storing portion constituted of the groove 5a and the groove 6a are formed in a step shape.

As a result of both edges of the sealing material 8 storing portion formed in a step shape in this manner, the spreading of the sealing material 8 can be gradually evened out, and thus, it is possible to minimize variation in the final width of the sealing material 8.

When considering the fact that the separation property would be worsened if the sealing material 8 were to spread to the separation line that separates a panel having a large display region R2 relative to the outer shape of the panel into a plurality of liquid crystal display panels 1, it is necessary to maintain a margin region of a certain width. With the configuration above, it is possible to mitigate variation in width of the sealing material 8 formed in the frame region R1, and thus, it is possible to make the margin region of the aforementioned certain width narrower, thus attaining a narrower frame for the liquid crystal display panel 1.

The sealing material 8 used in the present embodiment is heat-curable, and thus, by conducting heat treatment at a prescribed temperature on the sealing material 8, it is possible to bond together the color filter substrate 2 and the active matrix substrate 3, but the material for the sealing material 8 is not limited thereto, and it is apparent that a photocurable sealing material, a sealing material that also has a photocurable property, or the like can be used, for example.

By providing a liquid crystal display panel 1 with the narrow frame region R1 as stated above, it is possible to attain a liquid crystal display device with a large display region.

Figure 4:
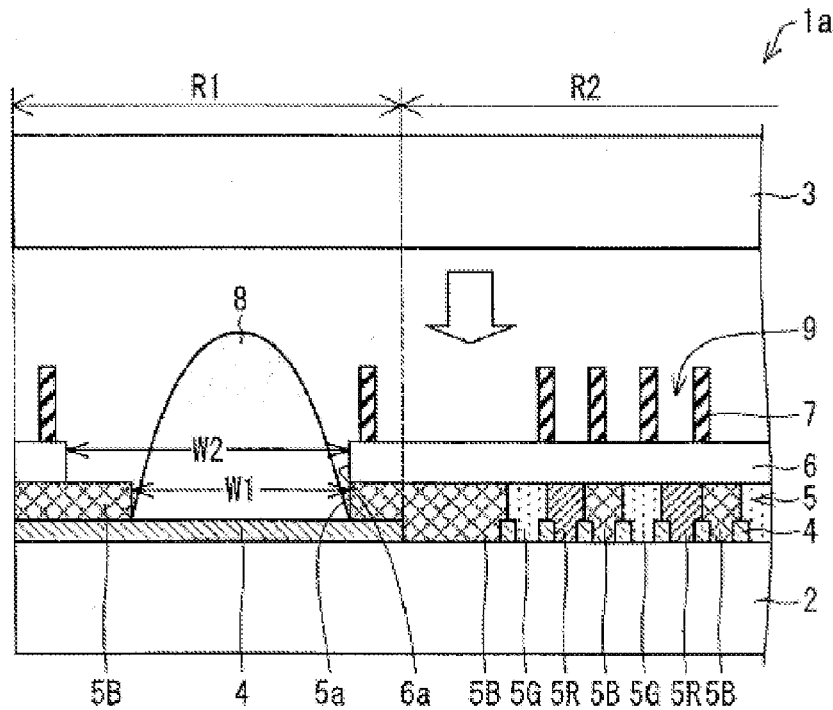
FIG. 4 shows one example of an edge shape of a sealing material storing portion that can be used in the liquid crystal display panel of one embodiment of the present invention.
Figure 5:
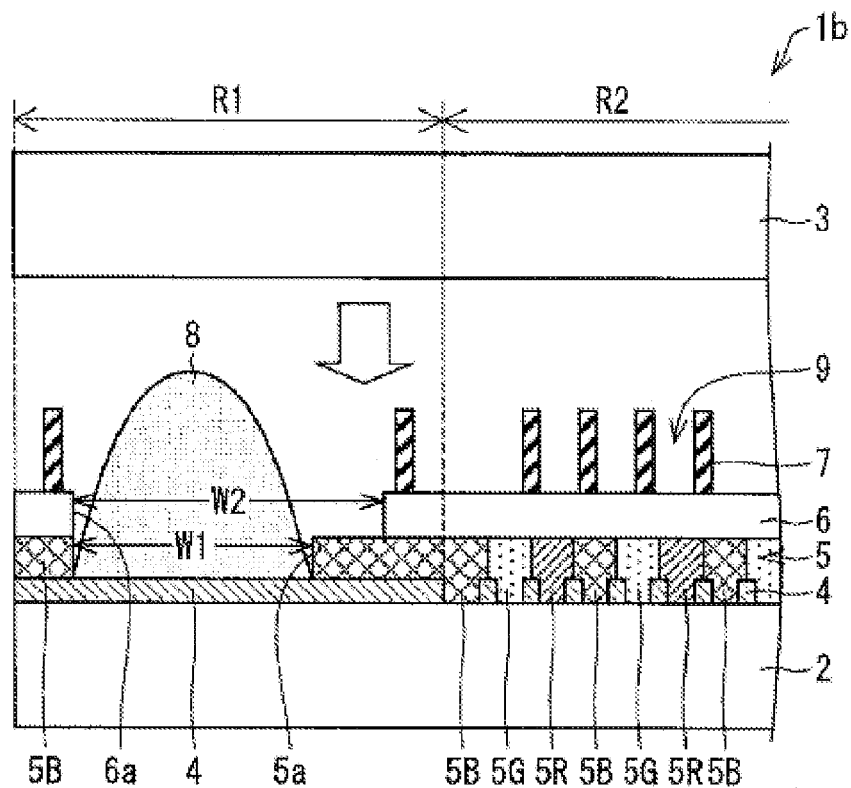
FIG. 5 shows another example of an edge shape of a sealing material storing portion that can be used in the liquid crystal display panel of one embodiment of the present invention.
Figure 6:
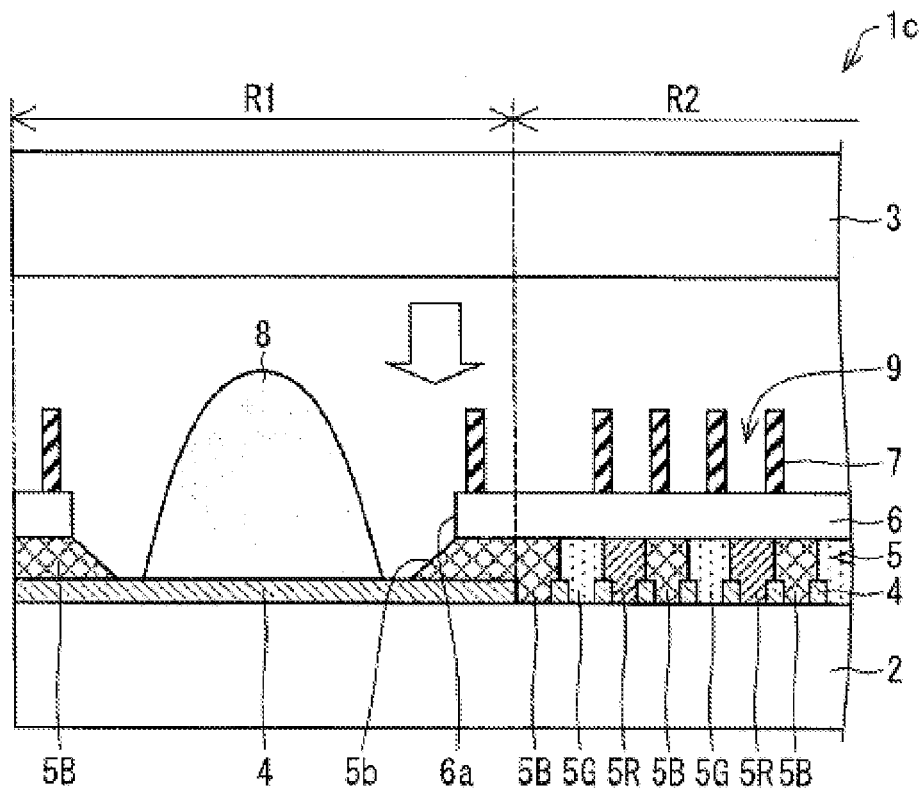
FIG. 6 shows yet another example of an edge shape of a sealing material storing portion that can be used in a liquid crystal display panel of one embodiment of the present invention.

With reference to FIGS. 4 to 6, examples of usable shapes of the edge of the sealing material 8 storing portion constituted of the groove 5a and the groove 6a in the liquid crystal display panel of the present embodiment will be described below.

Up to now, as shown in FIGS. 1 and 2, a case was described in which the center of the groove 5a and the center of the groove 6a matched, and both edges of the sealing material 8 storing portion constituted of the groove 5a and the groove 6a were formed in a step shape. However, the configuration is not limited thereto, and as shown in FIG. 4, for example, a configuration may be used in which the center of the groove 6a is to the left in the drawing compared to the center of the groove 5a, and only the left edge in the drawing of the sealing material 8 storing portion constituted of the groove 5a and the groove 6a is formed in a step shape.

As shown in FIG. 5, a configuration may be used in which the center of the groove 6a is to the right in the drawing compared to the center of the groove 5a, and only the right edge in the drawing of the sealing material 8 storing portion constituted of the groove 5a and the groove 6a is formed in a step shape.

In other words, as long as the groove 5a is positioned within the groove 6a in a plan view, the positional relation between the groove 5a and the groove 6a is not limited.

In either liquid crystal display panel 1a or 1b shown in FIG. 4 or FIG. 5, one edge of the sealing material 8 storing portion is formed in a step shape, which gradually evens out the spreading of the sealing material 8, and thus, it is possible to minimize variation in the final width of the sealing material 8.

Additionally, as shown in FIG. 6, the edges of a groove 5b can be formed so as to be tapered.

As for the sealing material 8 storing portion constituted of the groove 5b and the groove 6a provided in the frame region R1 of the liquid crystal display panel 1c shown in FIG. 6, neither edge is formed in a step shape, and instead both edges have a tapered shape. Thus, the sealing material 8 storing portion has a part with a width that becomes greater from bottom to top.

In such a portion, the spread of the sealing material 8 can be gradually evened out, as in a configuration with the step-shaped portion.

In FIGS. 1, 4, and 5, it is possible to have a step shape with the steps having a tapered shape.

Embodiment 2

Next, Embodiment 2 of the present invention will be described with reference to FIGS. 7 and 8. The present embodiment differs from Embodiment 1 in that no overcoat layer is provided on a color filter substrate 2, and in that a sealing material 8 storing portion is constituted of a groove 5a provided in a color filter layer 5 provided on the color filter substrate 2, and a groove 11a provided in an interlayer insulating film layer 11 provided on an active matrix substrate 3. Other configurations of Embodiment 2 are the same as described in Embodiment 1. For ease of description, members that have the same functions as members shown in drawings of Embodiment 1 will be assigned the same reference characters, and descriptions thereof will be omitted.

FIG. 7 shows a state before the color filter substrate 2 and the active matrix substrate 3 provided in a liquid crystal display panel 10 are bonded together, and FIG. 8 shows a state after the color filter substrate 2 and the active matrix substrate 3 provided in the liquid crystal display panel 10 are bonded together.

As shown in FIG. 7, in a frame region R1 of the liquid crystal display panel 10, the groove 5a having a width W1 is formed in a blue color filter layer 5B provided on the color filter substrate 2, and the groove 11a having a width W2 is formed in the interlayer insulating film layer 11 provided on the active matrix substrate 3.

In the present embodiment, the groove 5a is positioned within the groove 11a in a plan view, and the width W1 of the groove 5a is set to 300 μm and the width W2 of the groove 11a is set to 500 μm.

In the present embodiment, a positive acrylic photosensitive transparent photoresist is used for the interlayer insulating film layer 11, but the material used is not limited thereto.

According to the configuration above, as shown in FIG. 8, in the step of bonding together the color filter substrate 2 and the active matrix substrate 3, when the sealing material 8 spreads as a result, both edges of the groove 5a provided on the color filter substrate 2 side allow variation in the width of the sealing material 8 to be evened out to a certain extent in the left and right direction of the drawing, or in other words, the drawing width.

The sealing material 8 also has variation in height, which also causes variation in the amount of the sealing material 8 that overflows the groove 5a, but this variation is evened out by both edges of the groove 11a with a width of W2, provided on the active matrix 3 side.

Thus, as shown in FIG. 8, even if variation in the drawing width of the sealing material 8 occurs, the width of the sealing material 8 when it spreads when the color filter substrate 2 and the active matrix substrate 3 are bonded together is evened out as a result of the groove 5a and the groove 11a, and thus, variation in the final width of the sealing material 8 can be mitigated.

According to this configuration, it is possible to mitigate variation in the width of the sealing material 8 formed in the frame region R1, and thus, it is possible to make the margin region of a certain width narrower, thus attaining a narrower frame for the liquid crystal display panel 10.

Figure 9:
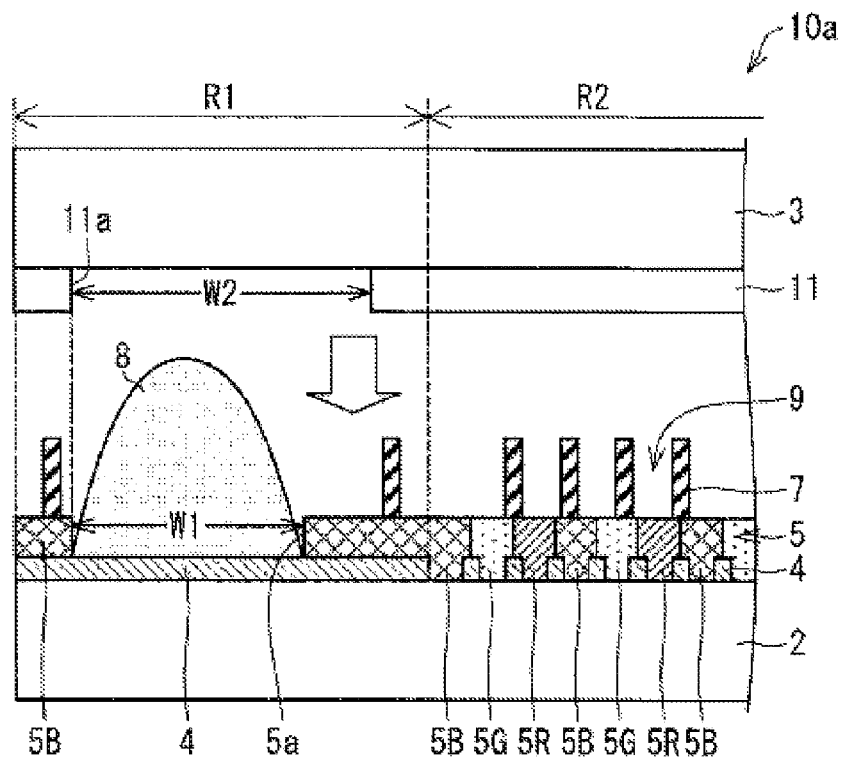
FIG. 9 shows one example of an edge shape of a sealing material storing portion that can be used in a liquid crystal display panel of the other embodiment of the present invention.
Figure 10:
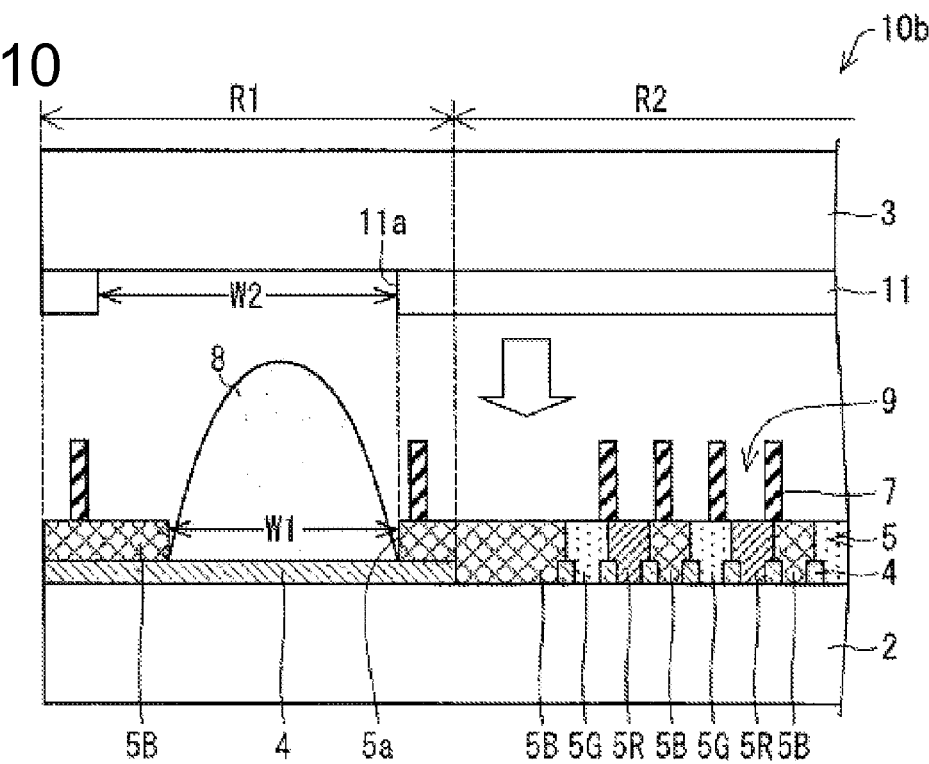
FIG. 10 shows another example of an edge shape of a sealing material storing portion that can be used in a liquid crystal display panel of the other embodiment of the present invention.

With reference to FIGS. 9 and 10, other examples of usable edge shapes of the sealing material 8 storing portion constituted of the groove 5a and the groove 11a in the liquid crystal display panel of the present embodiment will be described below.

FIG. 7 shows a case in which the center of the groove 5a matches with the center of the groove 11a in the liquid crystal display panel 10, in which both edges of the sealing material 8 storing portion constituted of the groove 5a and the groove 11a are formed in a step shape, but the configuration is not limited thereto, and a configuration may be used in which the center of the groove 11a is to the right in the drawing compared to the center of the groove 5a and only the edge on the right side in the drawing of the sealing material 8 storing portion constituted of the groove 5a and the groove 11a is in a step shape, as in the liquid crystal display panel 10a shown in FIG. 9, for example.

Additionally, a configuration may be used in which the center of the groove 11a is to the left in the drawing compared to the center of the groove 5a, and only the left edge in the drawing of the sealing material 8 storing portion constituted of the groove 5a and the groove 11a is formed in a step shape, as in the liquid crystal display panel 10b shown in FIG. 10.

In other words, as long as the groove 5a is positioned within the groove 11a in a plan view, the positional relation between the groove 5a and the groove 11a is not limited.

In the present embodiment, an example was described in which color filter layers 5R, 5B, and 5G of the respective colors (red, blue, and green) are provided on the color filter substrate 2, but the configuration is not limited thereto. If a COA (color filter on array) structure in which the color filter layers 5R, 5B, and 5G are provided on the active matrix substrate 3 is used, for example, then the groove 5a and the groove 11a simply need to be provided on the active matrix substrate 3 side.

Embodiment 3

Embodiment 3 of the present invention will be described with reference to FIGS. 11 and 12. The present embodiment differs from Embodiments 1 and 2 in that, in a frame region R1 of a liquid crystal display panel 20, a groove 4a with a width of W1 is also formed in a black matrix layer 4 provided on a color filter substrate 2, and a sealing material 8a storing portion is constituted of the groove 4a on the color filter substrate 2 side, a groove 5a with a width W2 provided in a color filter layer 5, and a groove 6a with a width W3 provided in an overcoat layer 6. Other configurations are the same as described in Embodiments 1 and 2. For ease of description, members that have the same functions as members shown in drawings of Embodiment 1 will be assigned the same reference characters, and descriptions thereof will be omitted.

Figure 11:
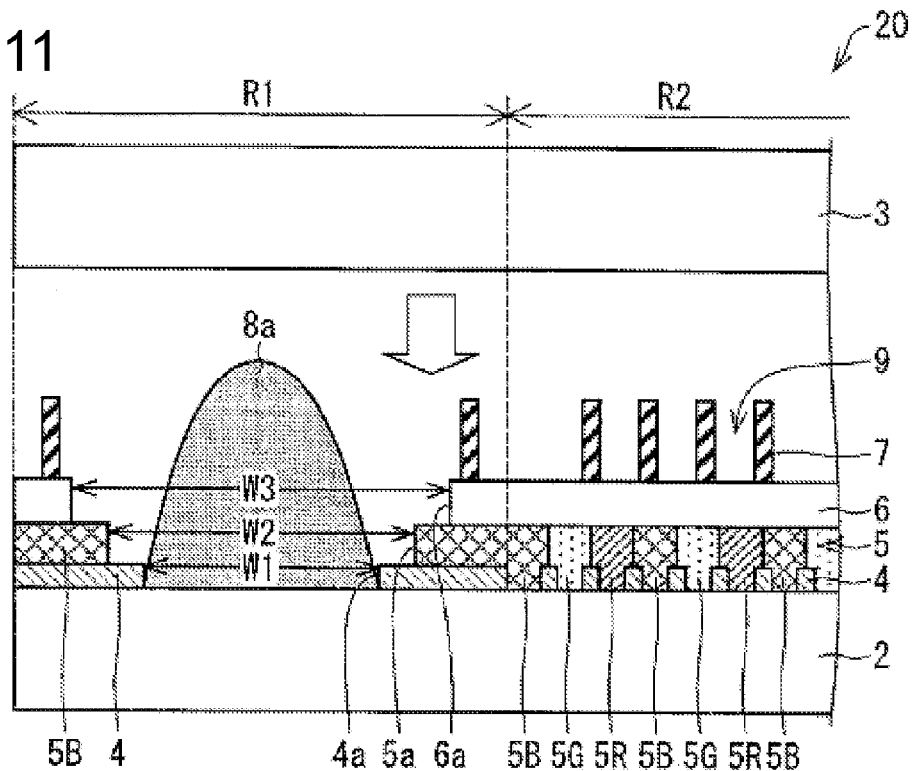
FIG. 11 shows a state before a color filter substrate and an active matrix substrate are bonded together in a liquid crystal display panel of yet another embodiment of the present invention.

As shown in FIG. 11, in the frame region R1 of the liquid crystal display panel 20, the groove 4a with a width W1 is also provided in the black matrix layer 4 provided on the color filter substrate 2, and the sealing material 8a storing portion has the groove 4a (third groove) provided on the color filter substrate 2 side, the groove 5a (first groove) with a width W2 provided in the color filter layer 5, and the groove 6a (second groove) with a width W3 provided in the overcoat layer 6.

In the liquid crystal display panel 20 shown in FIG. 11, the center of the groove 4a, the center of the groove 5a, and the center of the groove 6a all match, and both edges of the sealing material 8a storing portion including the groove 4a, the groove 5a, and the groove 6a are formed in a step shape, but the configuration is not limited thereto, and a configuration may be used in which only one edge of the sealing material 8a storing portion is given a step shape.

In the present embodiment, the groove 5a is positioned within the groove 6a in a plan view, and the groove 4a is positioned within the groove 5a in a plan view.

In the present embodiment, the width W1 of the groove 4a is 250 μm, the width W2 of the groove 5a is 350 μm, and the width W3 of the groove 6a is 500 μm.

Figure 12:
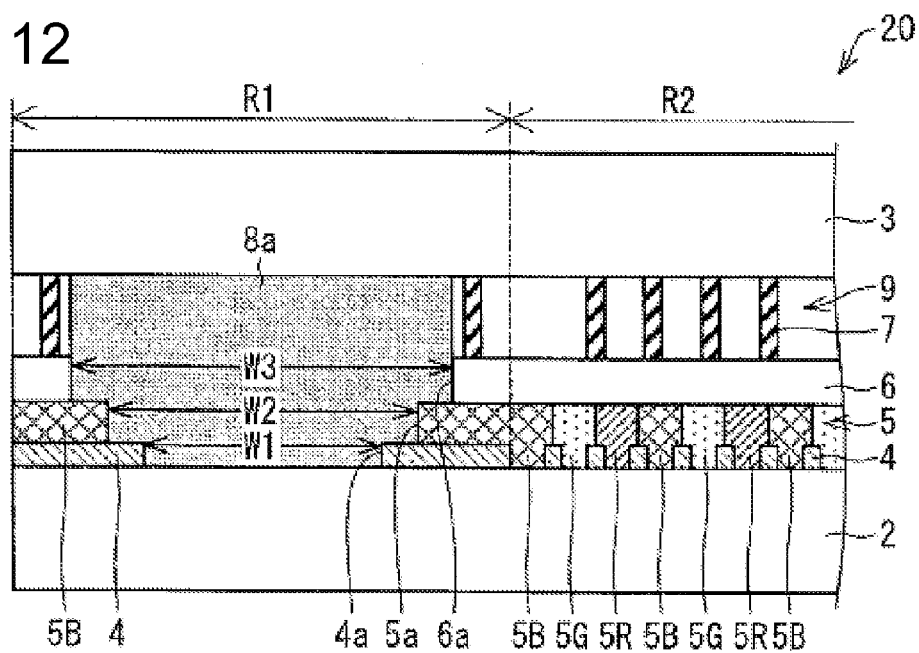
FIG. 12 shows a state after the color filter substrate and the active matrix substrate are bonded together in the liquid crystal display panel of yet another embodiment of the present invention.

According to the configuration above, as shown in FIG. 12, when the sealing material 8a spreads in the step of bonding together the color filter substrate 2 and the active matrix substrate 3, both edges of the groove 4a provided on the color filter substrate 2 side even out to a certain extent the varied width in the left and right direction in the drawing, or in other words, the drawing width of the sealing material 8a.

The sealing material 8a also has variation in height, which also causes variation in the amount of the sealing material 8 that overflows the groove 4a, but this variation is evened out by both edges of the groove 5a having a width of W2.

There is also variation in the amount of the sealing material 8 that overflows the groove 5a, but this variation is evened out by both edges of the groove 6a having a width of W3.

Thus, as shown in FIG. 12, even if variation in the drawing width of the sealing material 8a occurs, the width of the sealing material 8a when it spreads when the color filter substrate 2 and the active matrix substrate 3 are bonded together is evened out as a result of the groove 4a, the groove 5a, and the groove 6a, and thus, variation in the final width of the sealing material 8a can be mitigated.

According to this configuration, it is possible to mitigate variation in the width of the sealing material 8a formed in the frame region R1, and thus, it is possible to make the margin region of a certain width narrower, thus attaining a narrower frame for the liquid crystal display panel 20.

In the present embodiment, a heat-curable material that includes black titanium oxide or carbon black is used for the sealing material 8a in order to block any light that leaks out from the groove 4a formed in the black matrix layer 4.

In the present embodiment, a heat-curable sealing material is used for the sealing material 8a, but it is possible to use a sealing material that is also photocurable, and if using a sealing material that is also photocurable, it is possible to shorten the curing time for the sealing material.

In the present embodiment, the width W1 of the groove 4a is narrower than the width W2 of the groove 5a, but the configuration is not limited thereto, and the width W1 of the groove 4a may be equal to the width W2 of the groove 5a.

Embodiment 4

Embodiment 4 of the present invention will be described with reference to FIGS. 13 and 14. The present embodiment differs from Embodiments 1 to 3 in that, in a frame region R1 of a liquid crystal display panel 30, a sealing material 8 storing portion is constituted of a groove 5a formed in a color filter layer 5 provided on a color filter substrate 2, a groove 6a formed in the overcoat layer 6, and structures 7a and 7b formed in a wall shape to a height of a few μm and made of the same material as photospacers 7. Other configurations of Embodiment 4 are the same as described in Embodiments 1 to 3. For ease of description, members that have the same functions as members shown in drawings of Embodiments 1 to 3 will be assigned the same reference characters, and descriptions thereof will be omitted.

Figure 13:
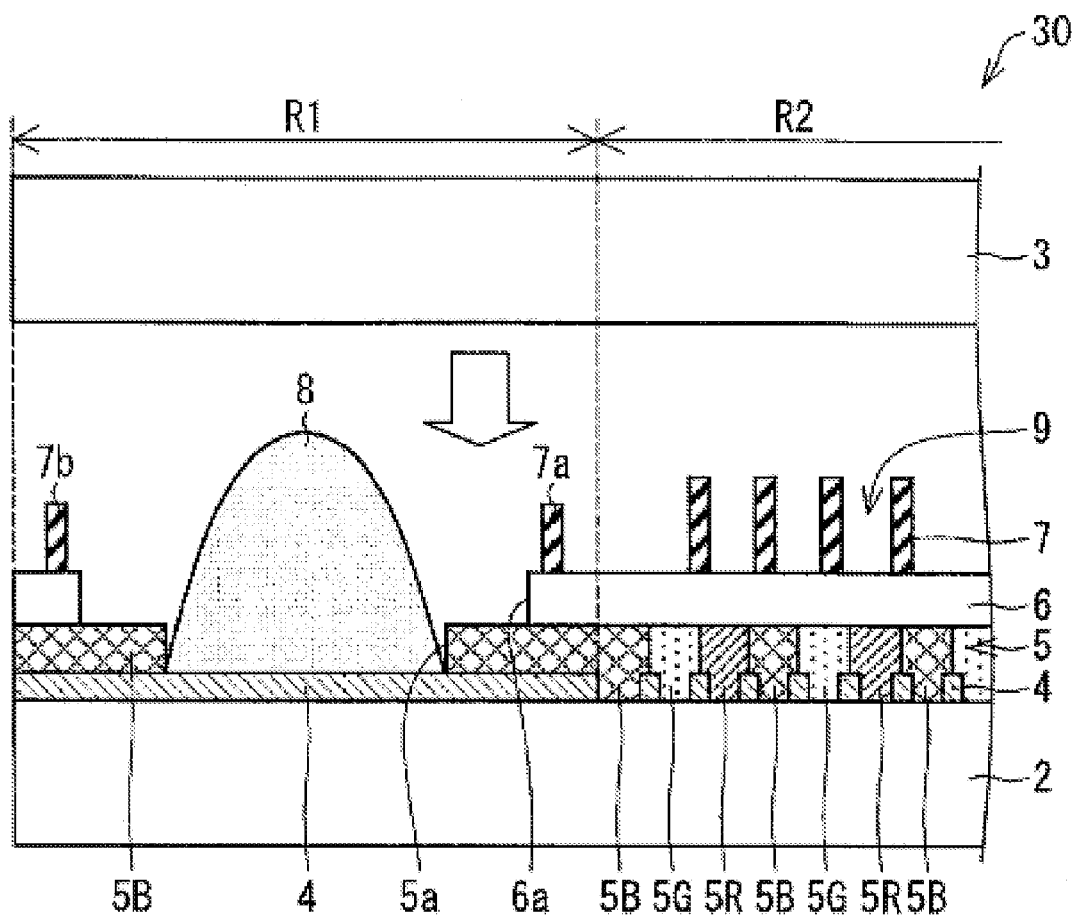
FIG. 13 shows a state before a color filter substrate and an active matrix substrate are bonded together in a liquid crystal display panel of yet another embodiment of the present invention in which wall-shaped structures are formed in a frame region.

As shown in FIG. 13, in the frame region R1 of the liquid crystal display panel 30, the wall-shaped structure 7a, the wall-shaped structure 7b, and the groove 6a (second groove) are disposed such that the groove 6a is between the structure 7a and the structure 7b in a plan view, and the groove 5a (first groove) is disposed in the groove 6a in a plan view.

In the present embodiment, the center of the groove 5a, the center of the groove 6a, and the center between the structure 7a and the structure 7b match, and both edges of the sealing material 8 storing portion including the groove 5a, the groove 6a, and the structures 7a and 7b are formed in a step shape.

In the present embodiment, the respective films are formed such that the width of the groove 5a is 250 μm, the width of the groove 6a is 350 μm, and the distance between the structure 7a and the structure 7b is 500 μm.

Also, in the present embodiment, in order to reduce the number of manufacturing steps, the structure 7a and the structure 7b are made of the same material (negative acrylic photosensitive transparent photoresist) as the photospacers 7 formed in the display region R2 of the liquid crystal display panel 30, but the configuration is not limited thereto.

As shown in FIG. 13, in the present embodiment, in order to allow the sealing material 8 formed on the color filter substrate 2 to be compressed by the active matrix substrate 3 and the substrates 2 and 3 to be bonded to each other, the height of the structures 7a and 7b is set lower than the height of the photospacers 7 formed in the display region R2 of the liquid crystal display panel 30, but as long as the substrates 2 and 3 can be bonded together, and a prescribed gap can be maintained between the substrates 2 and 3, then it is possible to set the height of only the structure 7b to be lower than the height of the photospacers 7, for example.

According to the configuration above, as shown in FIG. 14(a), when the sealing material 8 spreads in the step of bonding together the color filter substrate 2 and the active matrix substrate 3, both edges of the groove 5a provided on the color filter substrate 2 side can even out to a certain extent the varied width of the sealing material 8 in the left and right direction in the drawing, or in other words, the drawing width.

The sealing material 8 also has variation in height, which also causes variation in the amount of the sealing material 8 that overflows the groove 5a, but this variation is evened out by both edges of the groove 6a.

In addition, according to the above configuration, even if the sealing material 8 overflows the groove 6a and spreads and the spreading width thereof shows variation, by using the structures 7a and 7b formed in a wall shape to a height of a few μm as shown in FIG. 14(b), the variation can be evened out.

Thus, as shown in FIG. 14(a), even if variation in the drawing width of the sealing material 8 occurs, the width of the sealing material 8 when it spreads when the color filter substrate 2 and the active matrix substrate 3 are bonded together is evened out as a result of the groove 5a, the groove 6a, and the structures 7a and 7b, and thus, variation in the final width of the sealing material 8 can be mitigated.

According to this configuration, it is possible to mitigate variation in the width of the sealing material 8 formed in the frame region R1, and thus, it is possible to make the margin region of a certain width narrower, thus attaining a narrower frame for the liquid crystal display panel 30.

Embodiment 5

Embodiment 5 of the present invention will be described with reference to FIGS. 15 and 16. The present embodiment differs from Embodiments 1 to 4 in that, in a frame region R1 of a liquid crystal display panel, a sealing material 8 storing portion is constituted of two grooves of differing widths that are formed in one relatively thick film by using a halftone mask in order to adjust the exposure. Other configurations of Embodiment 5 are the same as described in Embodiments 1 to 4. For ease of description, members that have the same functions as members shown in drawings of Embodiment 1 will be assigned the same reference characters, and descriptions thereof will be omitted.

Figure 15:
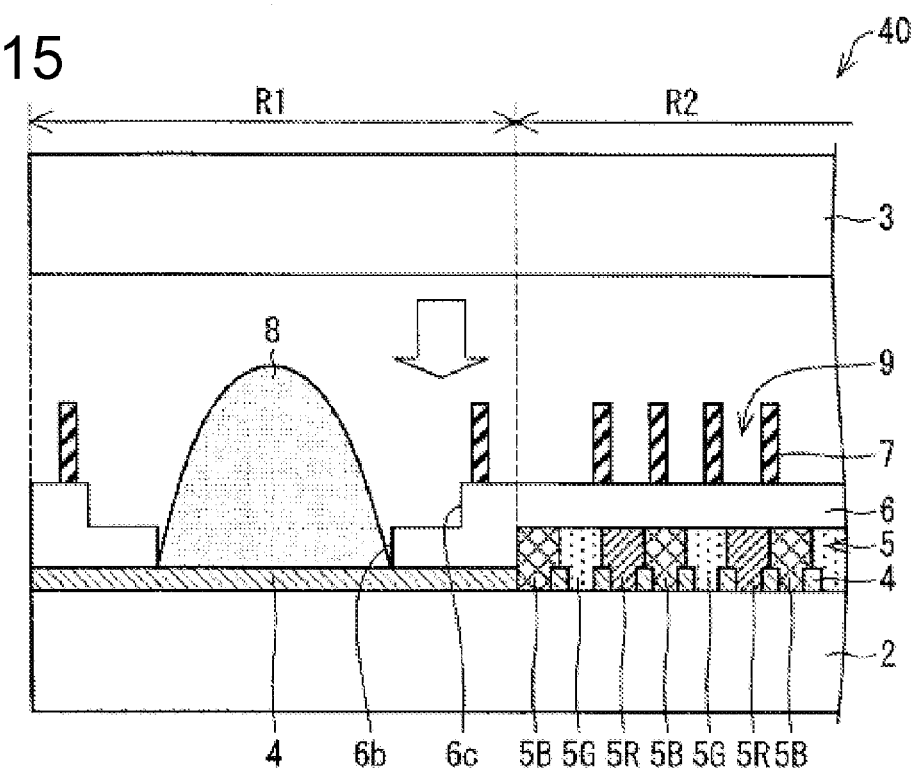
FIG. 15 shows a state before a color filter substrate and an active matrix substrate are bonded together in a liquid crystal display panel of yet another embodiment of the present invention that includes an overcoat layer in which two grooves of differing widths are formed in a frame region.

As shown in FIG. 15, in the frame region R1 of a liquid crystal display panel 40, a color filter layer 5 is not formed on a color filter substrate 2, and a halftone mask is used in order to adjust the amount of light that the overcoat layer 6 receives, thus forming grooves 6b and 6c of differing widths.

As shown in the drawings, the groove 6b (first groove) is positioned within the groove 6c (second groove) in a plan view.

The width of the groove 6b is 300 μm and the width of the groove 6c is 500 μm, and the center of the groove 6b matches with the center of the groove 6c, and thus, the sealing material 8 storing portion including the groove 6b and the groove 6c has both edges formed in a step shape.

According to the configuration above, in the step of bonding together the color filter substrate 2 and the active matrix substrate 3, when the sealing material 8 spreads as a result, both edges of the groove 6b provided on the color filter substrate 2 side allow variation in the width of the sealing material 8 to be evened out to a certain extent in the left and right direction of the drawing, or in other words, the drawing width.

The sealing material 8 also has variation in height, which also causes variation in the amount of the sealing material 8 that overflows the groove 6b, but this variation is evened out by both edges of the groove 6c.

Thus, even if variation in the drawing width of the sealing material 8 occurs, the width of the sealing material 8 when it spreads when the color filter substrate 2 and the active matrix substrate 3 are bonded together is evened out as a result of the groove 6b and the groove 6c, and thus, variation in the final width of the sealing material 8 can be mitigated.

According to this configuration, it is possible to mitigate variation in the width of the sealing material 8 formed in the frame region R1, and thus, it is possible to make the margin region of a certain width narrower, thus attaining a narrower frame for the liquid crystal display panel 40.

Although not shown in drawings, the liquid crystal display panel 40 may be provided with a color filter layer 5 in which the groove 5a is formed in the frame region R1, and with a sealing material 8 storing portion including the groove 5a, the groove 6b, and the groove 6c in which both edges thereof are formed in a step shape.

Figure 16:
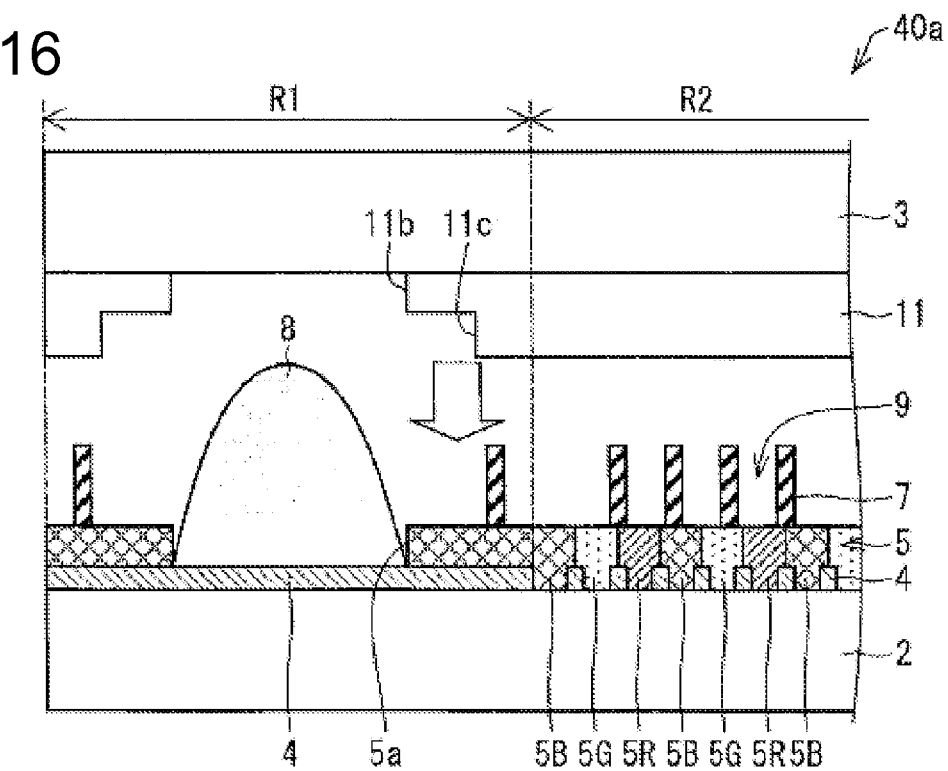
FIG. 16 shows a state before a color filter substrate and an active matrix substrate are bonded together in the liquid crystal display panel of yet another embodiment of the present invention that includes an interlayer insulating film in which two grooves of differing widths are formed in a frame region.

FIG. 16 shows a configuration of a liquid crystal display panel 40a that is provided with two grooves 11b and 11c having differing widths in an interlayer insulating film 11 formed relatively thick, and that includes a sealing material 8 storing portion including the groove 5a, the groove 11b, and the groove 11c, the two grooves 11b and 11c being formed in the frame region R1 using a halftone mask.

In the liquid crystal display panel 40a, the width of the groove 5a and the groove 11b is 300 µm and the width of the groove 11c is 500 µm, and the center of the groove 5a, the center of the groove 11b, and the center of the groove 11c match, and thus, both edges of the sealing material 8 storing portion including the groove 5a, the groove 11b, and the groove 11c are formed in a step shape.

According to the configuration above, when the sealing material 8 spreads in the step of bonding together the color filter substrate 2 and the active matrix substrate 3, both edges of the groove 5a formed on the color filter substrate 2 side and both edges of the groove 11b provided on the active matrix substrate 3 side can even out to a certain extent variation in the width in the left and right in the drawing, or in other words, the drawing width of the sealing material 8.

The portion of the sealing material 8 that overflows the groove 5a and the groove 11b is evened out by both edges of the groove 11c.

Thus, even if variation in the drawing width of the sealing material 8 occurs, the width of the sealing material 8 when it spreads when the color filter substrate 2 and the active matrix substrate 3 are bonded together is evened out as a result of the groove 5a, the groove 11b, and the groove 11c, and thus, variation in the final width of the sealing material 8 can be mitigated.

According to this configuration, it is possible to mitigate variation in the width of the sealing material 8 formed in the frame region R1, and thus, it is possible to make the margin region of a certain width narrower, thus attaining a narrower frame for the liquid crystal display panel 40a.

In a liquid crystal display panel of the present invention, it is preferable that the first film provided with the first groove be provided on one of the first substrate and the second substrate, and that the second film provided with the second groove be provided on the other of the first substrate and the second substrate.

According to the configuration above, the first groove and the second groove are respectively provided on different substrates.

Thus, it is possible to control the spreading width of the sealing material sandwiched between the first substrate and the second substrate from both substrate sides, thus mitigating variation in width.

As this variation decreases, it is possible to form a narrower margin region of a certain width than in conventional devices, thus attaining a liquid crystal display panel with a narrower frame.

In a liquid crystal display panel of the present invention, it is preferable that the non-display region be provided with a frame-shaped light-shielding layer along the non-display region, that the sealing material include a light-shielding material, that the light-shielding layer be provided with a frame-shaped third groove for disposing the sealing material therein, and that the third groove be positioned within the first groove in a plan view.

According to the configuration above, besides the first groove and the second groove, a third groove is provided in the light-shielding layer, and thus, it is possible to mitigate variation in the width of the sealing material even more effectively.

Therefore, as this variation decreases, it is possible to form a narrower margin region of a certain width than in conventional devices, thus attaining a liquid crystal display panel with a narrower frame.

In a liquid crystal display panel of the present invention, it is preferable that the third groove have a width narrower than the width of the first groove.

According to the configuration above, the width of the first groove, the width of the second groove, and the width of the third groove respectively differ from each other, thus allowing a step shape to be formed among the grooves, and therefore, it is possible to efficiently even out the portion of the sealing material overflowing each groove, thus even more effectively mitigating variation in the width of the sealing material.

Therefore, as this variation decreases, it is possible to form a narrower margin region of a certain width than in conventional devices, thus attaining a liquid crystal display panel with a narrower frame.

In a liquid crystal display panel of the present invention, it is preferable that, on the second film near both edges of the second groove, structures be provided in a frame shape such that the second groove is positioned therebetween.

According to the configuration above, even if the sealing material overflows the second groove and spreads, the structures can even out the portion of the sealing material that overflows the second groove, thus effectively mitigating variation in the width of the sealing material.

Therefore, as this variation decreases, it is possible to form a narrower margin region of a certain width than in conventional devices, thus attaining a liquid crystal display panel with a narrower frame.

In a liquid crystal display panel of the present invention, it is preferable that the structures be made of the same material as a holding member that is provided in the display region of the liquid crystal display panel and that maintains a gap between the first substrate and the second substrate.

According to the configuration above, the structure and the holding member are made of the same material, and thus, it is possible to form the structure and the holding member in one step simultaneously, improving the productivity of the liquid crystal display panel.

In a liquid crystal display panel of the present invention, it is preferable that the first film and the second film be the same film.

According to the configuration above, it is possible to form the first groove and the second groove in one film.

The present invention is not limited to the embodiment described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention is applicable to a liquid crystal display panel and a liquid crystal display device that includes a liquid crystal display panel.

DESCRIPTION OF REFERENCE CHARACTERS 1, 1a, 1b, 1c liquid crystal display panel
2 color filter substrate (first substrate)
3 active matrix substrate (second substrate)
4 black matrix layer (light-shielding layer)
4a groove (third groove)
5 color filter layer
5a groove (first groove)
5b groove (first groove)
6 overcoat layer
6a groove (second groove)
6b groove (first groove)
6c groove (second groove)
7 photospacer
7a, 7b structure
8, 8a sealing material
9 liquid crystal
10, 10a, 10b liquid crystal display panel
11 interlayer insulating film
11a groove (second groove)
11b groove (first groove)
11c groove (second groove)
20 liquid crystal display panel
30 liquid crystal display panel
40, 40a liquid crystal display panel
R1 frame region (non-display region)
R2 display region

The invention claimed is:

1. A liquid crystal display panel, comprising a first substrate and a second substrate disposed facing each other, the first substrate and the second substrate having therebetween: a liquid crystal layer; a sealing material provided surrounding the liquid crystal layer and bonding together the first substrate and the second substrate; and a plurality of films provided on at least one of the first substrate and the second substrate,
wherein the plurality of films includes at least a first film and a second film, the first film having a first groove, the second film having a second groove, respectively provided in a frame shape in a non-display region that is a region peripheral to a display region of the liquid crystal display panel, the first groove and the second groove being provided to dispose the sealing material along the non-display region,
wherein the first groove has a width narrower than a width of the second groove,
wherein the width of the second groove is set at a prescribed width such that when the first substrate and the second substrate are bonded together, a portion of the sealing material that overflows the first groove can be provided along the second groove,
wherein the sealing material spreads in the entirety of the first groove and the second groove when the first substrate and the second substrate are bonded together,
wherein the first groove is positioned within the second groove in a plan view, and
wherein, on the second film near both edges of the second groove, structures are provided in a frame shape such that the second groove is positioned therebetween.

2. A liquid crystal display panel, comprising a first substrate and a second substrate disposed facing each other, the first substrate and the second substrate having therebetween: a liquid crystal layer; a sealing material provided surrounding the liquid crystal layer and bonding together the first substrate and the second substrate; and a plurality of films provided on at least one of the first substrate and the second substrate,
wherein the plurality of films includes at least a first film and a second film, the first film having a first groove, the second film having a second groove, respectively provided in a frame shape in a non-display region that is a region peripheral to a display region of the liquid crystal display panel, the first groove and the second groove being provided to dispose the sealing material along the non-display region,
wherein the first groove has a width narrower than a width of the second groove,
wherein the width of the second groove is set at a prescribed width such that when the first substrate and the second substrate are bonded together, a portion of the sealing material that overflows the first groove can be provided along the second groove,
wherein the sealing material spreads in the entirety of the first groove and the second groove when the first substrate and the second substrate are bonded together,
wherein the first groove is positioned within the second groove in a plan view,
wherein the first film provided with the first groove is provided on one of the first substrate and the second substrate,
wherein the second film provided with the second groove is provided on another of the first substrate and the second substrate, and
wherein, on the second film near both edges of the second groove, structures are provided in a frame shape such that the second groove is positioned therebetween.

3. The liquid crystal display panel according to claim 1,
wherein the non-display region is provided with a frame-shaped light-shielding layer along the non-display region,
wherein the sealing material includes a light-shielding material,
wherein the light-shielding layer is provided with a frame-shaped third groove for disposing the sealing material therein, and
wherein the third groove is positioned within the first groove in a plan view.

4. The liquid crystal display panel according to claim 3, wherein the third groove has a width narrower than the width of the first groove.

5. The liquid crystal display panel according to claim 1, wherein the structures are made of the same material as a holding member that is provided in the display region of the liquid crystal display panel and that maintains a gap between the first substrate and the second substrate.

6. A liquid crystal display device, comprising the liquid crystal display panel according to claim 1.

7. The liquid crystal display panel according to claim 2,
wherein the non-display region is provided with a frame-shaped light-shielding layer along the non-display region,
wherein the sealing material includes a light-shielding material,
wherein the light-shielding layer is provided with a frame-shaped third groove for disposing the sealing material therein, and
wherein the third groove is positioned within the first groove in a plan view.

8. The liquid crystal display panel according to claim 7, wherein the third groove has a width narrower than the width of the first groove.

9. The liquid crystal display panel according to claim 2, wherein the structures are made of the same material as a holding member that is provided in the display region of the liquid crystal display panel and that maintains a gap between the first substrate and the second substrate.

10. A liquid crystal display device, comprising the liquid crystal display panel according to claim 2.

* * * * *